US011817222B2

(12) United States Patent
Nam et al.

(10) Patent No.: US 11,817,222 B2
(45) Date of Patent: Nov. 14, 2023

(54) METHOD OF REMOVING FOREIGN SUBSTANCES FROM CRDM AND DEVICE FOR EXECUTING SAME

(71) Applicant: DOOSAN ENERBILITY CO., LTD., Changwon (KR)

(72) Inventors: Chae Ho Nam, Yongin (KR); Ho Yel Lee, Sejong (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 213 days.

(21) Appl. No.: 17/139,075

(22) Filed: Dec. 31, 2020

(65) Prior Publication Data

US 2022/0215977 A1    Jul. 7, 2022

(30) Foreign Application Priority Data

Jan. 3, 2020    (KR) ........................ 10-2020-0000641

(51) Int. Cl.
*G21C 7/14*    (2006.01)
*G21C 19/20*    (2006.01)

(52) U.S. Cl.
CPC ............ *G21C 19/207* (2013.01); *G21C 7/14* (2013.01)

(58) Field of Classification Search
CPC . G21C 7/12; G21C 7/14; G21C 19/20; G21C 19/207
See application file for complete search history.

(56) References Cited

U.S. PATENT DOCUMENTS 3,992,255 A * 11/1976 DeWesse ................. G21C 7/12
                                                    226/150
5,009,834 A    4/1991 Tessaro
                   (Continued)

FOREIGN PATENT DOCUMENTS

KR      20090049734 A    5/2009
KR      101268833 B1    5/2013
                   (Continued)

OTHER PUBLICATIONS

Gunther, William, and Kenneth Sullivan. Aging Assessment of the Westinghouse PWR Control Rod Drive System. Division of Engineering, Office of Nuclear Regulatory Research, US Nuclear Regulatory Commission, 1991. (Year: 1991).*

*Primary Examiner* — Sharon M Davis
(74) *Attorney, Agent, or Firm* — Harvest IP Law, LLP

(57) ABSTRACT

A method of removing floating foreign substances that may interfere with a normal operation of an electromechanical mechanism of a control rod drive mechanism and a device for executing the same are provided. The method of removing the foreign substances from the control rod drive mechanism comprising a driving shaft including a plurality of teeth and disposed in a vertical direction in the control rod drive mechanism, a first part configured to hold or release a lower end portion of the driving shaft depending on whether a stationary gripper coil is activated, a second part configured to hold or release an intermediate portion of the driving shaft depending on whether a movable gripper coil is activated, and a third part configured to move the second part in the vertical direction depending on whether a lift coil is activated may include: activating at least one of the stationary gripper coil, the movable gripper coil, and the lift coil to drive the first part, the second part, or the third part in a state in which the driving shaft is not able to move; and removing (Continued)

the foreign substances from the first part, the second part, or the third part.

7 Claims, 7 Drawing Sheets

(56) References Cited

U.S. PATENT DOCUMENTS

| 6,473,481 B1 | 10/2002 | Hitachi et al. |
| 2013/0223579 A1 | 8/2013 | Allen et al. |

FOREIGN PATENT DOCUMENTS

| KR | 20130140062 A | 12/2013 |
| KR | 101659532 B1 | 9/2016 |

* cited by examiner

METHOD OF REMOVING FOREIGN SUBSTANCES FROM CRDM AND DEVICE FOR EXECUTING SAME

CROSS-REFERENCE TO RELATED APPLICATION

This application claims priority to Korean Patent Application No. 10-2020-0000641, filed on Jan. 3, 2020, the disclosure of which is incorporated herein by this reference in its entirety.

BACKGROUND

Field

Apparatuses and methods consistent with exemplary embodiments relate to a method of removing foreign substances from a control rod drive mechanism (CRDM) and a device for executing the same, and more particularly, to a method of driving a control rod drive mechanism to ensure the control rod drive mechanism is driven according to a series of sequences for removing foreign substances to prevent a control rod from slipping or falling due to an obstacle in the control rod drive mechanism in a nuclear power plant, and a device for executing the same.

Description of the Related Art

A nuclear power plant generates heat by fission of nuclear fuel and heat-exchanges primary side heat energy obtained by controlling heat from a steam generator to a secondary side to operate a turbine and generator to produce and supply electrical energy.

In a nuclear reactor, the combustion of nuclear fuel is controlled by controlling the number of neutrons absorbed by the nuclear fuel, and a control rod, which is a neutron absorber, is used for this end. The control rod is manufactured by cladding boron, cadmium, hafnium, etc., which easily absorb thermal neutrons that mediate the fission reaction, with stainless steel or aluminum.

The control rods are arranged between the fuel rods in a form of an assembly, and control nuclear reactivity of a core by adjusting the number of neutrons by rising or lowering in a vertical direction by the control rod drive mechanism. When the control rod is inserted into the core, thermal neutrons are absorbed and the reactivity of the reactor is reduced. Conversely, removing the control rod increases the reactivity of the reactor.

On the other hand, the control rod drive mechanism, which is an essential element of the configuration of a nuclear power plant, is a device of an electromechanical mechanism composed of several complex structures, and if the nuclear power plant is operated continuously, floating foreign substances may enter the inside of the complex structure of the control rod drive mechanism. If such foreign substances are continuously accumulated, it may interfere with normal operation of the control rod drive mechanism, so there is a need to remove these foreign substances. In a related art, because there is no proper method to remove the foreign substances during operation, the foreign substances in the control rod drive mechanism have been managed in such a way that they wish to be removed only through withdrawal or insertion operation of the control rod or the control rod is removed manually by personnel during a planned preventive maintenance period.

However, in the method of removing foreign substances through the withdrawal or insertion of the control rod, there is a possibility that the control rod slips or falls. In addition, removing foreign substances during the planned preventive maintenance period also increases management costs and risks personnel being exposed to radiation, thereby posing a threat to the health of the inputted personnel. In addition, it is impossible to properly remove foreign substances in the complex structure even if personnel are put in. Accordingly, it was evaluated that the removal of foreign substances during the planned preventive maintenance period greatly reduced the management efficiency.

The present disclosure is proposed in light of these problems, and it is possible to easily remove the foreign substances from the control rod drive mechanism without additional personnel.

SUMMARY

Aspects of one or more exemplary embodiments provide a method capable of removing foreign substances existing in a control rod drive mechanism (CRDM) without shutting down a power plant and a device (e.g., maintenance module for removing CRDM crud) necessary to execute such a method.

For example, the present disclosure supplies/disconnects power to each coil by individually applying, and applying similar current to coils (e.g., stationary gripper coil, movable gripper coil, lift coil) during the configurations of the control rod drive mechanism. Accordingly, aspects of one or more exemplary embodiments also provide a method of removing foreign substances between mechanical components of the control rod drive mechanism within the structure during a driving process by individually driving constituent parts of the mechanical mechanism corresponding to each coil.

Additional aspects will be set forth in part in the description which follows and, in part, will become apparent from the description, or may be learned by practice of the exemplary embodiments.

According to an aspect of an exemplary embodiment, there is provided a method of removing foreign substances from a control rod drive mechanism comprising a driving shaft including a plurality of teeth and disposed in a vertical direction in the control rod drive mechanism, a first part configured to hold or release a lower end portion of the driving shaft depending on whether a stationary gripper coil is activated, a second part configured to hold or release an intermediate portion of the driving shaft depending on whether a movable gripper coil is activated, and a third part configured to move the second part in the vertical direction depending on whether a lift coil is activated, the method including: activating at least one of the stationary gripper coil, the movable gripper coil, and the lift coil to drive the first part, the second part, or the third part in a state in which the driving shaft is not able to move, and removing the foreign substances from the first part, the second part, or the third part.

The method of removing foreign substances from the control rod drive mechanism may further include: allowing the first part to hold the lower end portion of the driving shaft in a state in which the stationary gripper coil is activated; and activating the lift coil to move the second part upward in the vertical direction.

The method of removing foreign substances from the control rod drive mechanism may further include inactivating the lift coil to move the second part downward in the vertical direction.

The method of removing foreign substances from the control rod drive mechanism may further include repeating the activating and the inactivating the lift coil.

The method of removing foreign substances from the control rod drive mechanism may further include: allowing the first part to hold the lower end portion of the driving shaft in a state in which the stationary gripper coil is activated; and activating the movable gripper coil so that the second part holds the intermediate portion of the driving shaft.

The method of removing foreign substances from the control rod drive mechanism may further include inactivating the movable gripper coil so that the second part releases the intermediate portion of the driving shaft.

The method may further include repeating the activating and the inactivating the movable gripper coil.

The method of removing foreign substances from the control rod drive mechanism may further include: allowing the second part to hold the intermediate portion of the driving shaft in a state in which the movable gripper coil is activated; and activating the stationary gripper coil so that the first part holds the lower end portion of the driving shaft.

The method may further include inactivating the stationary gripper coil so that the first part releases the lower end portion of the driving shaft.

The method may further include repeating the activating and the inactivating the stationary gripper coil.

The first part of the control rod drive mechanism may include: a first latch configured to be latched on any of a plurality of teeth of the driving shaft; a first link having one end connected to the first latch and the other end connected to a first latch plunger; a first latch pole with or without magnetism according to whether the stationary gripper coil is activated; and the first latch plunger pulled or not pulled to the first latch pole according to whether the stationary gripper coil is activated.

The second part of the control rod drive mechanism may include: a second latch configured to be latched on any of a plurality of teeth of the driving shaft; a second link having one end connected to the second latch and the other end connected to a second latch plunger; a second latch pole with or without magnetism according to whether the movable gripper coil is activated; and the second latch plunger pulled or not pulled to the second latch pole according to whether the movable gripper coil is activated.

The third part of the control rod drive mechanism may include a third pole with or without magnetism according to whether the lift coil is activated, wherein the second latch pole is pulled or not pulled to the third pole according to whether the lift coil is activated.

The method may further include setting an operation prohibition condition with respect to the lift coil, the operation prohibition condition being a state in which the stationary gripper coil and the movable gripper coil are activated.

The method may further include setting an operation prohibition condition with respect to the movable gripper coil, the operation prohibition condition being a state in which the lift coil is activated or the stationary gripper coil is inactivated.

The method may further include setting an operation prohibition condition with respect to the stationary gripper coil, the operation prohibition condition being a state in which the lift coil is activated or the movable gripper coil is inactivated.

According to an aspect of another exemplary embodiment, there is provided a non-transitory computer-readable recording medium having recorded thereon commands executable by a computer for performing a method of removing foreign substances from a control rod drive mechanism comprising a driving shaft including a plurality of teeth and disposed in a vertical direction in the control rod drive mechanism, a first part configured to hold or release a lower end portion of the driving shaft depending on whether a stationary gripper coil is activated, a second part configured to hold or release an intermediate portion of the driving shaft depending on whether a movable gripper coil is activated, and a third part configured to move the second part in the vertical direction depending on whether a lift coil is activated, the method including: activating at least one of the stationary gripper coil, the movable gripper coil, and the lift coil to drive the first part, the second part, or the third part in a state in which the driving shaft is not able to move, and removing the foreign substances from the first part, the second part, or the third part.

According to an aspect of another exemplary embodiment, there is provided a device for removing foreign substances from a control rod drive mechanism comprising a driving shaft including a plurality of teeth and disposed in a vertical direction in the control rod drive mechanism, a first part configured to hold or release a lower end portion of the driving shaft depending on whether a stationary gripper coil is activated, a second part configured to hold or release an intermediate portion of the driving shaft depending on whether a movable gripper coil is activated, and a third part configured to move the second part in the vertical direction depending on whether a lift coil is activated, the device including: a memory, and a processor configured to: activate at least one of the stationary gripper coil, the movable gripper coil, and the lift coil to drive the first part, the second part, or the third part in a state in which the driving shaft is not able to move; and remove the foreign substances from the first part, the second part, or the third part.

The device may be a card-type device capable of being inserted into a power box.

The device may further include a switch terminal configured to manually control any one of the stationary gripper coil, the movable gripper coil, and the lift coil.

According to the one or more exemplary embodiments, there is an effect of easily removing the foreign substances existing in the control rod drive mechanism during an operation of a nuclear power plant.

In addition, according to one or more exemplary embodiments, there is an effect of significantly improving the safety of maintenance of the nuclear power plant by preventing workers from being put into works that have a risk of radiation exposure.

Further, according to one or more exemplary embodiments, because the foreign substances may be removed by repeating only the individual driving of each coil of the control rod drive mechanism, there is an effect that exceeds a time limit for performing a removal operation of the foreign substances.

BRIEF DESCRIPTION OF THE DRAWINGS

The above and other aspects will be more clearly understood from the following description of the exemplary embodiments with reference to the accompanying drawings, in which.

DETAILED DESCRIPTION

Figure 1:
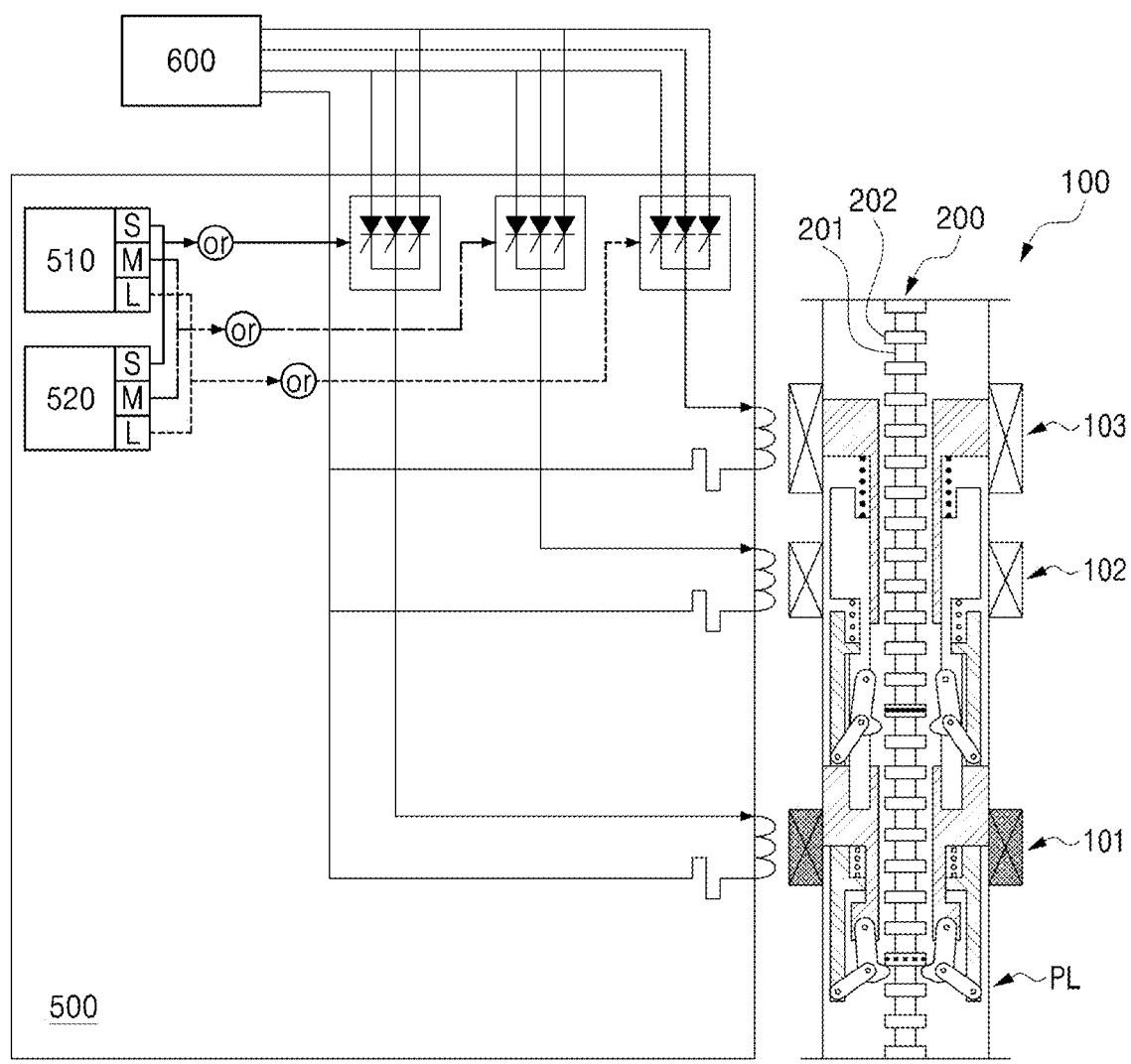
FIG. 1 is a view showing a basic outline of a control rod drive mechanism and an entire system for controlling the same.

Various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

The functional blocks shown in the drawings and described below are only examples of possible implementations. In other implementations, other functional blocks may be used in a range without departing from the spirit and scope of the detailed description. Further, although one or more functional blocks of the present disclosure are represented as individual blocks, one or more of the functional blocks of the present disclosure may be a combination of various hardware and software configurations that perform the same function.

Also, "a module," "a unit," or "a part" in the disclosure performs at least one function or operation, and these elements may be implemented as hardware, such as a processor or integrated circuit, software that is executed by a processor, or a combination thereof. Further, a plurality of "modules," a plurality of "units," or a plurality of "parts" may be integrated into at least one module or chip and may be implemented as at least one processor except for "modules," "units" or "parts" that should be implemented in a specific hardware.

In addition, the expression "includes certain elements" is an "open type" expression and simply refers to the existence of the corresponding elements and should not be understood as excluding additional elements.

Furthermore, when a component is referred to as being "connected" or "engaged" to another component, it should be understood that it may be directly connected or engaged to the other component, but other components may exist in the middle of the component and another component.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinbelow, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

FIG. 1 is a view showing a basic outline of a control rod drive mechanism and an entire system for controlling the same.

Referring to FIG. 1, the control rod drive mechanism 100 is a composition in charge of operations such as withdrawal, insertion, and dropping of a control rod 200 for controlling a fission reaction in a nuclear power plant. The control rod drive mechanism 100 is equipped with the control rod 200 including a driving shaft 201 and teeth 202 inside. Here, the control rod drive mechanism 100 may be include a stationary gripper coil 101, a movable gripper coil 102, and a lift coil 103 on its outer circumferential surface starting from a bottom. For reference, in the drawing, a thick line separating coils and internal structures is referred to as a pressure boundary surface PL, and an inside of the pressure boundary surface PL is filled with water. A portion driven corresponding to each coil is embedded in the pressure boundary surface PL, and this structure will be described later with reference to FIG. 2.

A power box 500 is a type of a control panel capable of externally controlling the control rod drive mechanism 100 and may exist in a state in which a master card device 510 and a slave card device 520 are inserted. At this time, the master card device 510 performs a function of controlling and monitoring, and the slave card device 520 is in a standby state and may maintain a state that does not affect the controlling and monitoring function of the master card device 510. Each of the card devices stores a series of commands for controlling the control rod drive mechanism 100 according to a situation. For example, a device according to an exemplary embodiment may be understood as a card device of the same type as the card devices above, and more specifically, the device according to an exemplary embodiment may be manufactured to be inserted and replaced at a position of the slave card device 520 if necessary. That is, commands for executing a method of removing foreign substances from the control rod drive mechanism according to an exemplary embodiment may be stored in a separate card-type device (also referred to as a test card device), and if necessary (e.g., if it is necessary to remove foreign substances), by using the separate card-type device inserted instead of the slave card device 520, it is possible to remove the foreign substances through activation and deactivation of individual coils.

Meanwhile, a power supply 600 is configured to supply power according to a control command from the power box 500, and the power supplied from the power supply 600 may be used to activate each coil of the control rod drive mechanism 100. For example, other coils (e.g., power supply coils) may be provided at positions adjacent to the coils outside the pressure boundary surface PL of the control rod drive mechanism 100, and an induced current is generated in the coils of the control rod drive mechanism 100 (e.g., the stationary gripper coil 101, the movable gripper coil 102, and the lift coil 103) whenever current is applied to the other coils, so that each coil may be activated. On the other hand, it is understood that even if not in the above manner, the power from the power supply 600 may be used as an energy supply source to ultimately activate each coil of the control rod drive mechanism 100.

Figure 2:
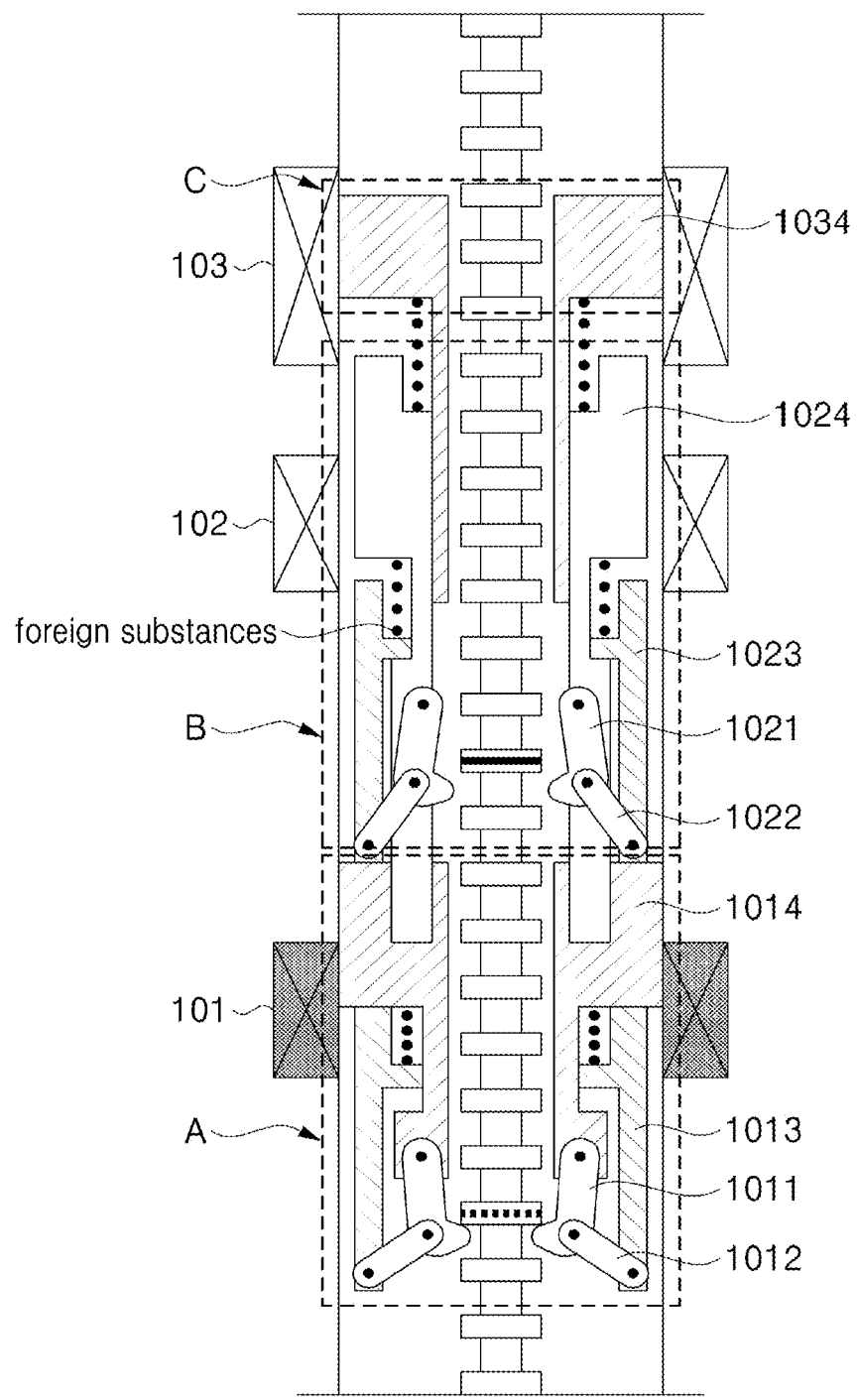
FIG. 2 is a view showing a detailed illustration of mechanical structure of the control rod drive mechanism.

FIG. 2 is a view showing a detailed illustration of mechanical structure of the control rod drive mechanism 100. Referring to FIG. 2, the control rod drive mechanism 100 may include a first part A, a second part B, and a third part C.

The first part A is a configuration located at a lowermost stage of the control rod drive mechanism 100. Here, the first part A has a configuration implemented to hold or release a lower end portion of the driving shaft 201 depending on whether the stationary gripper coil 101 is activated, that is, whether current is applied to the stationary gripper coil 101. In this case, holding the lower end portion of the driving shaft 201 means a state in which the control rod is held by the first part A latched by any one of a plurality of teeth 202 formed on the driving shaft 201 to prevent the control rod from moving from a current position as shown in FIG. 2.

The first part A may include a first latch 1011 capable of being latched on any one of the plurality of teeth 202 of the driving shaft 201, a first link 1012 having one end connected to the first latch 1011 and the other end connected to a first latch plunger 1013, a first latch pole 1014 with or without magnetism depending on whether the stationary gripper coil 101 is activated, and the first latch plunger 1013 that is pulled or not pulled by the first latch pole 1014 depending on whether the stationary gripper coil 101 is activated.

For example, FIG. 2 shows a state in which the stationary gripper coil 101 is activated. In this case, the first latch pole 1014 becomes magnetic, and the first latch plunger 1013 is pulled by this magnetic force. According to this operation, the first latch 1011 is latched by one of the teeth 202 on the driving shaft 201, resulting in the control rod being held in the current position.

The second part B is a configuration located at a middle stage of the control rod drive mechanism 100. Here, the second part B has a configuration implemented to hold or release an intermediate portion of the driving shaft 201 depending on whether the movable gripper coil 102 is activated, that is, whether current is applied to the movable gripper coil 102 and to move in a vertical direction according to whether the lift coil 103 is activated.

The second part B may include a second latch 1021 capable of being latched on any one of the plurality of teeth 202 of the driving shaft 201, a second link 1022 having one end connected to the second latch 1021 and the other end connected to a second latch plunger 1023, a second latch pole 1024 with or without magnetism depending on whether the movable gripper coil 102 is activated, and the second latch plunger 1023 that is pulled or not pulled by the second latch pole 1024 depending on whether the movable gripper coil 102 is activated.

For example, FIG. 2 shows a state in which the movable gripper coil 102 is inactivated. In this case, because the second latch pole 1024 is not magnetized, the second latch plunger 1023 will not be pulled towards the second latch pole 1024. That is, because the second latch pole 1024 is not magnetic, the second latch plunger 1023 will remain unpulled toward the second latch pole 1024. As a result, the second latch 1021 also exists in a state of not being latched on the teeth 202 of the driving shaft 201.

The third part C is a configuration located at an upper stage of the control rod drive mechanism 100. Here, the third part C has a configuration capable of moving the second part B in the vertical direction according to whether the lift coil 103 is activated.

The third part C may include a third pole 1034 with or without magnetism according to whether the lift coil 103 is activated. In this case, the second latch pole 1024 may be pulled or not pulled to the third pole 1034 according to whether the lift coil 103 is activated.

For example, FIG. 2 shows a state in which the lift coil 103 is inactivated. In this case, because the third pole 1034 is not magnetized, the second latch pole 1024 will remain unpulled toward the third pole 1034. As a result, it may be seen that the entire second part B exists in a state of being spaced apart from the third part C.

FIGS. 3A to 3F are views showing a sequence diagram illustrating a process in which a control rod is pulled out using the control rod drive mechanism 100. It has been described above that the control rod may be withdrawn, inserted, and held by using the control rod drive mechanism 100 described in FIGS. 1 and 2. Meanwhile, FIGS. 3A to 3F show a process in which the control rod is withdrawn step by one step through upward driving in a normal state.

Figure 3:
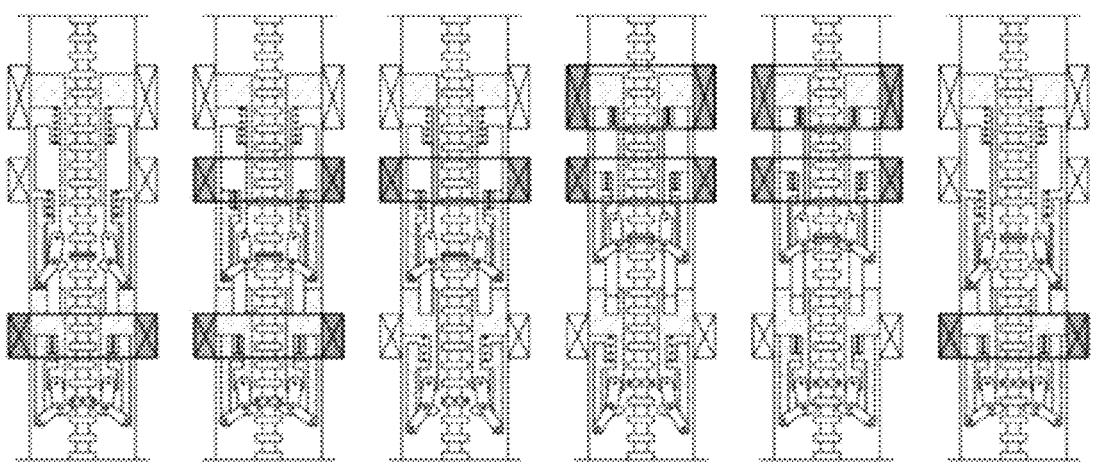
FIGS. 3A to 3F are views showing a sequence diagram illustrating a process in which a control rod is pulled out by the control rod drive mechanism in a normal case.

FIG. 3A shows an initial state of the control rod drive mechanism 100. In the initial state, only the stationary gripper coil 101 is activated. That is, it is the state in which the first part is holding the control rod at a current position. In such a state, the slave control card is removed from the control rod drive mechanism, and the test card for the lift coil 103 is mounted, thereby completing preparation for execution of a first exemplary embodiment.

FIG. 3B is a preliminary preparation step for withdrawing the control rod, in which the movable gripper coil 102 in addition to the stationary gripper coil 101 is activated so that the current position of the control rod is more firmly held. One of the important functions of the control rod drive mechanism 100 is to firmly hold the control rod to prevent the control rod from slipping (control rod sliding down inside the drive mechanism) and falling (control rod falling off by being completely released from the drive mechanism). This is an essential function for the stable operation of nuclear power plants. FIG. 3B is a view showing a step of faithfully performing this function, that is, a state in which two coils are activated to maintain the lower and middle stages of the control rod drive mechanism, thereby preventing in advance the control rod from slipping and falling.

FIG. 3C is a view showing a state in which the withdrawal preparation is completed. In this step, only the movable gripper coil 102 is activated and the stationary gripper coil 101 is inactivated so that the control rod is capable of being moved in the vertical direction.

FIG. 3D is a view showing a step of the withdrawal. In this step, the lift coil 103 is activated to hold the drive shaft 201 of the control rod drive mechanism, and the second part rises toward the third part, thereby causing the control rod to be withdrawn one step.

FIG. 3E is a view showing a step of preparing to return to the initial state. In this step, the position of the control rod is held in the current state by activating the stationary gripper coil 101 while the control rod is withdrawn one step.

FIG. 3F is a view showing a state returned to the initial state. In this step, as in FIG. 3A, only the stationary gripper coil 101 is activated.

The control rod withdrawal process using the control rod drive mechanism 100 may be accomplished by repeating the above-described processes.

Figure 4:
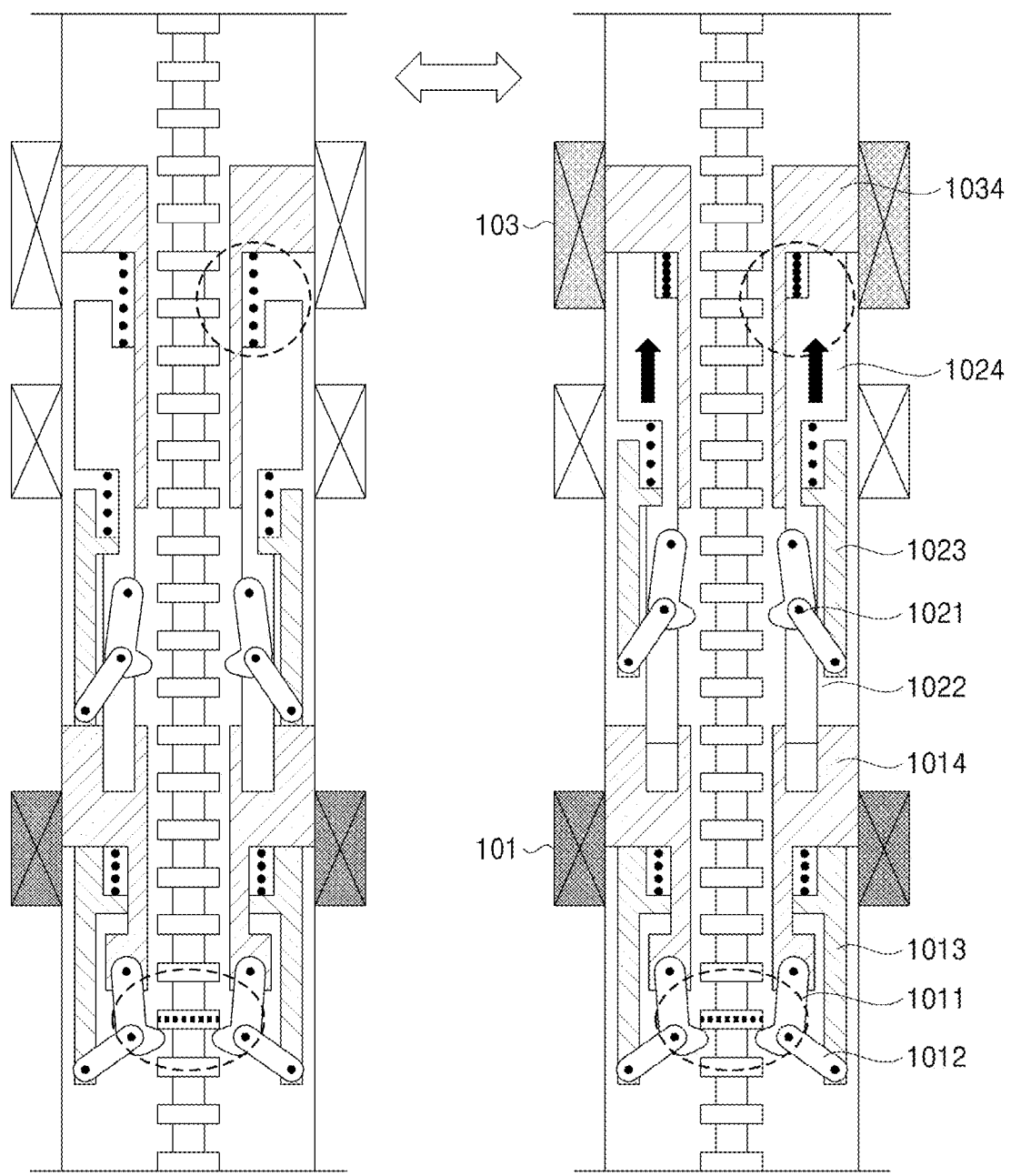
FIG. 4 is a view illustrating a process of removing foreign substances by controlling the control rod drive mechanism according to a first exemplary embodiment.

FIG. 4 is a view illustrating a method of removing foreign substances by controlling the control rod drive mechanism 100 according to a first exemplary embodiment. In the first exemplary embodiment, foreign substances accumulated between the second part and the third part may be removed by activating the lift coil 103 when the stationary gripper coil 101 is activated and the movable gripper coil 102 is inactivated.

The method of removing foreign substances by controlling the control rod drive mechanism 100 may include activating the stationary gripper coil 101 so that the first part holds the lower end portion of the driving shaft 201, and activating the lift coil 103 so that the second part moves upward in a vertical direction. For reference, if the control rod drive mechanism is already in operation, the activating the stationary gripper coil 101 may have been already performed, and it may be understood as a step that a state in which the lower end portion of the driving shaft 201 has been held is maintained.

Here, the driving shaft 201 is held by activating the stationary gripper coil 101 of the lowermost stage of control rod drive mechanism 100, and the second part may move freely up and down by inactivating the movable gripper coil 102 of the middle stage of the control rod drive mechanism 100. In this case, by repeating activation and inactivation of the lift coil 103, the second part may be repeatedly driven up and down, thereby removing foreign substances (in an upper circle) stuck between the second part and the third part (i.e., the second latch pole 1024 and the third pole 1034).

Because the inside of the control rod drive mechanism 100, that is, the inside of the pressure boundary surface PL, is filled with water, irregular fluid flow may be induced in the fluid if the mechanical devices are repeatedly driven, thereby removing foreign substances. That is, even if foreign substances are accumulated between the second and third parts, the irregular fluid flow may occur during repeated driving, and the irregular fluid flow has an effect of dispersing the foreign substances accumulated in the mechanical devices. Further, the dispersed foreign substances are sent to the outside of the second or third part, resulting in removal of the foreign substances. For reference, the activation and inactivation of the lift coil 103 may be repeatedly performed at predetermined periods, but the activation and inactivation may be repeatedly performed at irregular time intervals without following the predetermined periods, thereby generating a more diverse flow of fluid. In addition, by changing the magnitude of the current applied to the lift coil 103, that is, by adjusting the magnitude of the magnetic attraction between the second latch pole 1024 and the third pole 1034, more diverse fluid flows may be generated. If the magnitude of the attractive force is adjusted, the speed at which the second latch pole 1024 approaches the third pole 1034 may be changed, and the fluid flow may be changed in this process.

As such, the method of removing foreign substances from the control rod drive mechanism according to the first exemplary embodiment is accomplished in a manner that the vertical movement of the second part may be repeatedly induced by activating and inactivating the lift coil 103 while maintaining the stationary gripper coil 101 activated. Through this, it is possible to achieve an effect of removing foreign substances between the second part and the third part.

Meanwhile, in the method of removing foreign substances from the control rod drive mechanism according to the first exemplary embodiment, there may be a separate operation prohibition condition in which activation of the lift coil 103 is prohibited. For example, when both the stationary gripper coil 101 and the movable gripper coil 102 are in an activated (energized) state, activation for the lift coil 103 may not be performed according to the operation prohibition command even if an activation command is input from the user. This is to prevent mechanical damage to the control rod drive mechanism. That is, if the lift coil 103 is activated while both the stationary gripper coil 101 and the movable gripper coil 102 are activated, mechanical damage to the latch, teeth, etc. may occur due to improper movement of the control rod drive mechanism. In this regard, in the exemplary embodiment, a separate operation prohibition condition may be set to prevent such damage. In addition, for reference, the lift coil 103 will operate when an individual disable switch of the control rod drive mechanism is 'off', and when the individual disable switch is 'on', the control of the lift coil 103 is basically impossible.

Figure 5:
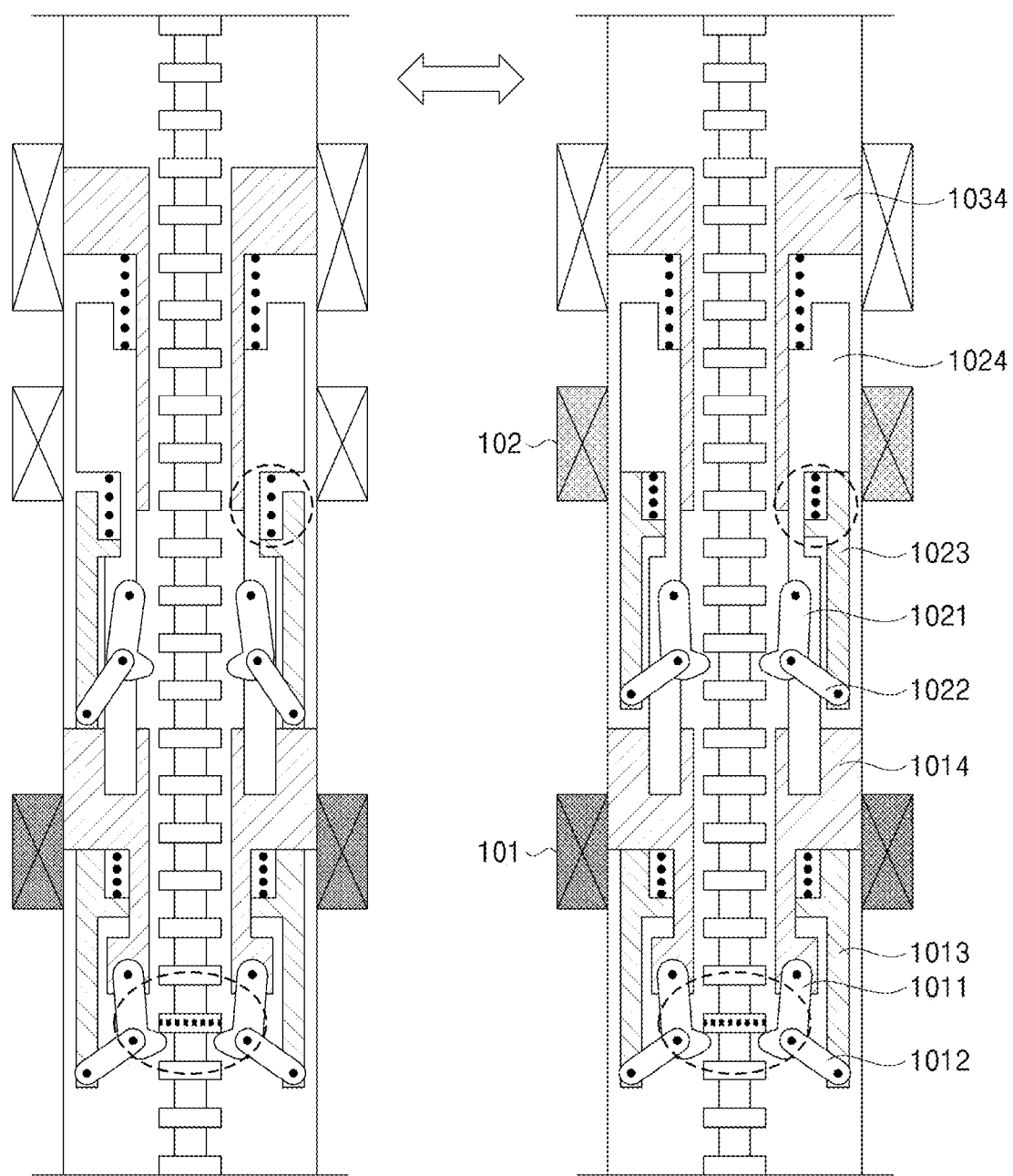
FIG. 5 is a view illustrating a process of removing foreign substances by controlling the control rod drive mechanism according to a second exemplary embodiment.

FIG. 5 is a view illustrating a method of removing foreign substances by controlling the control rod drive mechanism 100 according to a second exemplary embodiment. Here, the method may include steps of repeating activation and inactivation of the movable gripper coil 102 in a state in which the stationary gripper coil 101 is activated. For reference, the second exemplary embodiment may be performed on a premise that the stationary gripper coil 101 is activated. In this state, the slave control card is removed from the control rod drive mechanism, and the test card for the movable gripper coil 102 is mounted, thereby completing the preparation for carrying out the second exemplary embodiment.

The second exemplary embodiment may include activating the stationary gripper coil 101 so that the first part holds the lower end portion of the driving shaft 201 and activating the movable gripper coil 102 so that the second part holds the intermediate portion of the driving shaft 201.

That is, in the second exemplary embodiment, the holding operation of the intermediate portion is repeatedly driven while the lower end portion of the control rod drive mechanism is held, thereby removing foreign substances existing inside the second part (i.e., the foreign substances existing between the second latch plunger 1023 and the second latch pole 1024).

The principle of removing foreign substances in the second exemplary embodiment is to remove the foreign substances by generating an irregular fluid flow according to the mechanical movement as described in the first exemplary embodiment.

On the other hand, as in the first exemplary embodiment, an operation prohibition condition in which activation of the movable gripper coil 102 is prohibited may be set separately in the second exemplary embodiment. The operation prohibition condition in which the activation of the movable gripper coil 102 is prohibited may include, for example, a state in which the lift coil 103 is activated or a state in which the stationary gripper coil 101 is inactivated. When the lift coil 103 is activated, the second latch 1021 of the second part is not latched between the teeth of the driving shaft 201 and is erroneously latched on a peripheral edge of one teeth, thereby causing mechanical damage as well as the instability problem in a state in which the driving shaft 201 is held. Therefore, in the state in which the lift coil 103 is activated, removal of foreign substances by activation of the movable gripper coil 102 is prohibited. In addition, in the state in which the stationary gripper coil 101 is inactivated, because the driving shaft 201 is not engaged with the stationary gripper coil 101, there is a risk that the driving shaft falls when the movable gripper coil 102 is repeatedly activated-inactivated. Therefore, this case may also be set as an operation prohibition condition.

Figure 6:
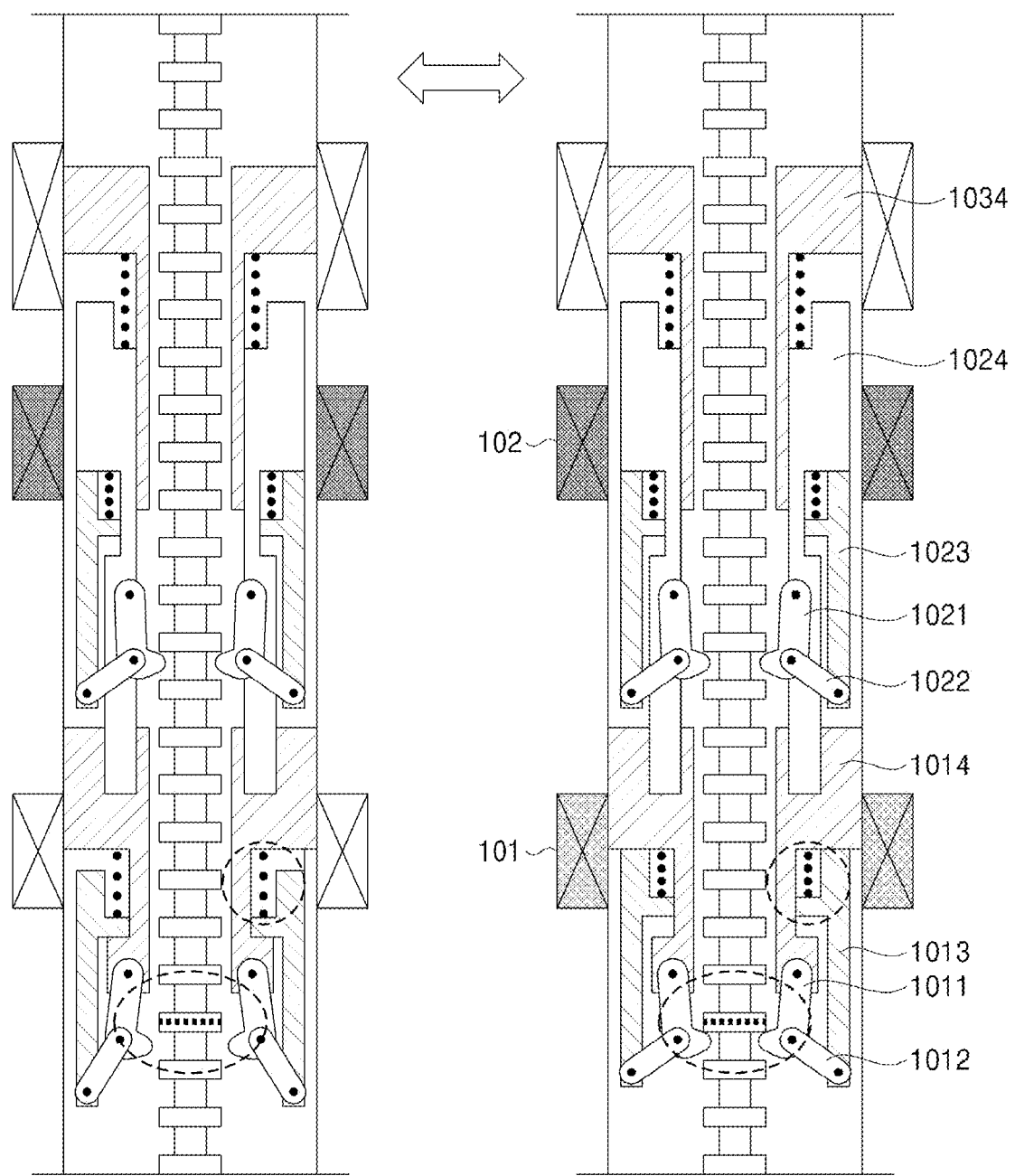
FIG. 6 is a view illustrating a process of removing foreign substances by controlling the control rod drive mechanism according to a third exemplary embodiment.

FIG. 6 is a view illustrating a method of removing foreign substances by controlling the control rod drive mechanism 100 according to a third exemplary embodiment. Here, the method may include steps of repeating activation and inactivation of the stationary gripper coil 101 in a state in which the movable gripper coil 102 is activated.

The third exemplary embodiment may include activating the movable gripper coil 102 so that the second part holds the intermediate portion of the driving shaft 201 and activating the stationary gripper coil 101 so that the first part holds the lower end portion of the driving shaft 201.

That is, in the third exemplary embodiment, the holding operation of the lower end portion is repeatedly driven while the intermediate portion of the control rod drive mechanism is held, thereby removing foreign substances existing inside the first part (i.e., the foreign substances existing between the first latch plunger 1013 and the first latch pole 1014).

For reference, in order for the third exemplary embodiment to be performed, a series of preliminary steps need to be preemptively taken. These preemptive measures may include: (i) making the stationary gripper coil 101 active and making the movable gripper coil 102 and the lift coil 103 inactive; (ii) manually making a double hold state (referring to a state in which the already activated stationary gripper coil 101 passes more and more current to have a stronger holding force, and the movable gripper coil 102 is activated. In other words, double hold is consequentially maintained by activation of both the stationary gripper coil 101 and the movable gripper coil 102.); (iii) removing the slave control card and mounting test card for the stationary gripper coil 101 (At this time, emergency mode and non-emergency mode are displayed on the control rod drive system.); and (iv) withdrawing the master control card (SCGD: solution-cathode glow discharge) for the stationary gripper coil 101. After that, the third exemplary embodiment may be carried out by energizing and de-energizing the stationary gripper coil 101 by the test card for the stationary gripper coil 101. The reason why the preemptive measures are necessary is to realize a control environment in which only the movable gripper coil 102 is activated and the stationary gripper coil 101 can be activated and inactivated while holding the control rod. That is, this is because the control environment may only be executed through the preemptive steps. For reference, after the removal of foreign substances is completed by activation and inactivation of the stationary gripper coil 101, it is possible to return to a normal control rod driving state by reversely performing the preemptive measures. In other words, it is possible to return to the normal control rod driving state by performing the following steps: mounting the master control card (SCGD) for the stationary gripper coil; removing the test card for the stationary gripper coil and mounting the slave control card; and manually releasing the double hold state.

Meanwhile, in the third exemplary embodiment as well, a condition for prohibiting activation of the stationary gripper coil 101, that is, an operation prohibition condition may be set. For example, in a state in which the lift coil 103 is activated or in a state in which the movable gripper coil 102 is inactivated, operation of the stationary gripper coil 101 may be inhibited even if an activation/inactivation input for removing foreign substances is input to the stationary gripper coil 101. This is because the driving shaft 201 may not be properly held even if the stationary gripper coil 101 is activated while the lift coil 103 is activated, and there is a risk that the driving shaft may fall off while the movable gripper coil 102 is inactivated.

Figures 7A, 7B:
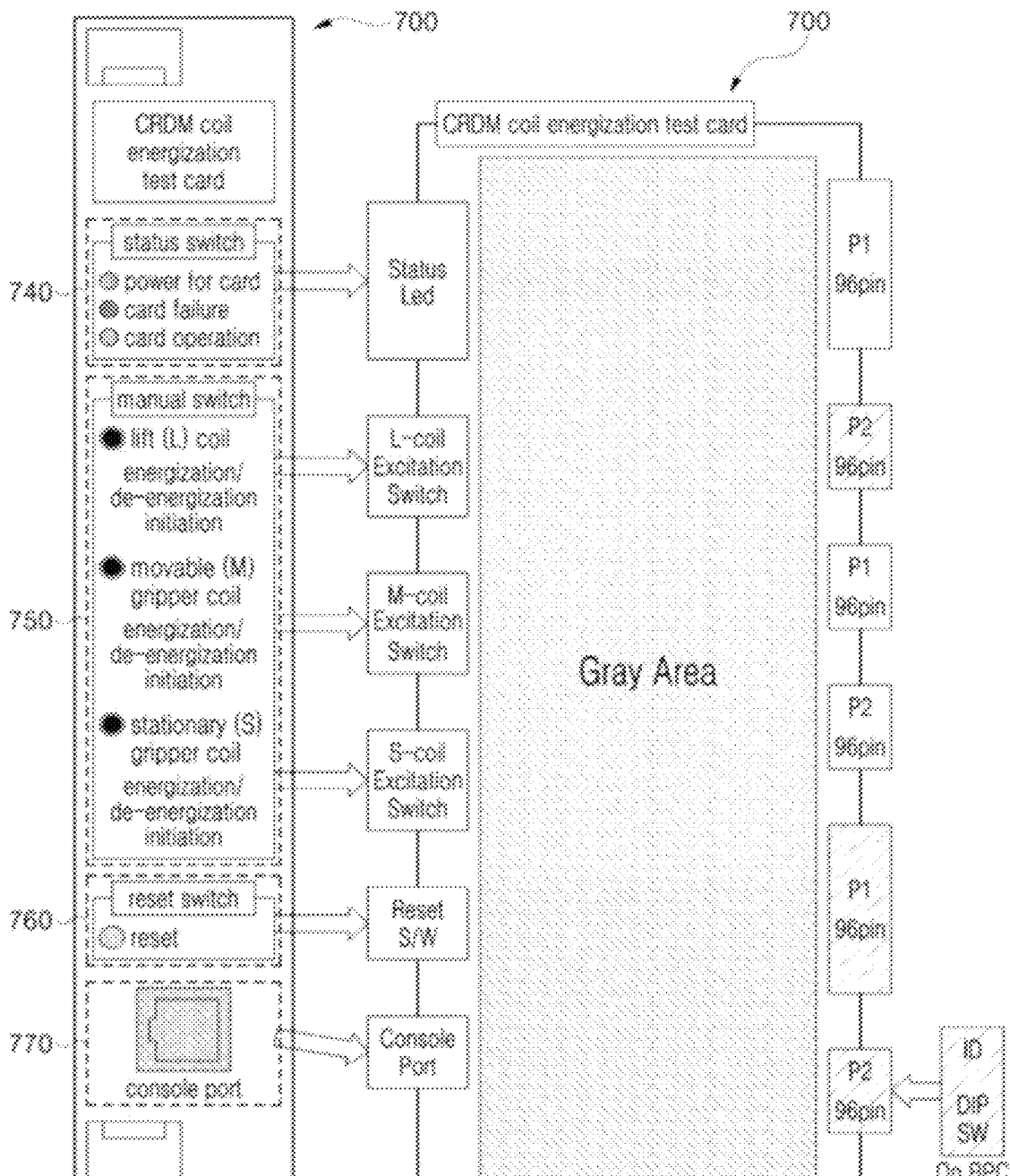
FIGS. 7A and 7B are views illustrating a device necessary for executing a method of removing foreign substances from the control rod drive mechanism according to an exemplary embodiment.

FIGS. 7A and 7B are views illustrating a device for executing a method of removing foreign substances from the control rod drive mechanism according to an exemplary embodiment, for example, a card-type device 700 that may be inserted into the power box 500 or the control panel. For reference, it is understood that the power box or control panel may be regarded as a component of the control rod drive mechanism.

FIG. 7A is a front view illustrating a device inserted into the power box 500, and FIG. 7B is a side view of the device.

Referring to FIGS. 7A and 7B, the device may include a processor and a memory. Here, the processor may be referred to as a controller, a microcontroller, a microprocessor, a microcomputer, or the like. In addition, a central processing unit may be implemented by hardware or firmware, software, or a combination thereof. When implemented using the hardware, the central processing unit may be implemented using an application specific integrated circuit (ASIC) or a digital signal processor (DSP), a digital signal processing device (DSPD), a programmable logic device (PLD), a field programmable gate array (FPGA), or the like. When implemented using the firmware or software, the central processing unit may be implemented using the firmware or software that may be configured to include modules, procedures or functions, or the like that perform the functions or operations of the above hardware. In addition, the memory may be implemented with Read Only Memory (ROM), Random Access Memory (RAM), Erasable Programmable Read Only Memory (EPROM), Electrically Erasable Programmable Read-Only Memory (EEPROM), flash memory, Static RAM (SRAM), Hard Disk Drive (HDD), Solid State Drive (SSD), and the like. Examples of the program command may include a high-level language which may be executed by a computer using an interpreter or the like as well as a machine language wire as produced by a compiler. The hardware device may be configured to operate as one or more software modules in order to perform the operation of the exemplary embodiment, and vice versa.

Commands for executing the method for controlling the control rod drive mechanism 100 described above may be stored in the memory, and the processor may correspond to a configuration that substantially executes such commands.

The device may be implemented in a card type that may be inserted into the power box 500 or the control panel. When it is necessary to remove foreign substances from the control rod drive mechanism 100, the slave card device 520 is removed and the card-type device 700 according to the exemplary embodiment is inserted to control the control rod driving device 100.

For example, the card-type device 700 for removing foreign substances may include essential components and nonessential configurations when compared to the card device (master or slave) that is inserted during normal operation of the control rod drive mechanism. The configurations essentially required in the card-type device 700 may include an FPGA (Field Programmable Gate Array), a switch terminal 750, etc. in addition to the above-described processor and memory. Because the card-type device 700 is temporarily inserted by replacing the slave card device 520 only when it is necessary to remove foreign substances, the card-type device 700 may include circuit configurations different from that of the card devices inserted during normal operation.

The card-type device 700 according to the exemplary embodiment may include a status display window 740 configured to display the status of the card, a switch terminal 750 configured to manually control any one of the stationary gripper coil 101, the movable gripper coil 102, and the lift coil 103 in addition to the processor and memory, a reset switch 760, and a console port 770.

While one or more exemplary embodiments have been described with reference to the accompanying drawings, it is to be understood by those skilled in the art that various modifications and changes in form and details can be made therein without departing from the spirit and scope as defined by the appended claims. Therefore, the description of the exemplary embodiments should be construed in a descriptive sense only and not to limit the scope of the claims, and many alternatives, modifications, and variations will be apparent to those skilled in the art.

What is claimed is:

1. A method of removing foreign substances from a control rod drive mechanism comprising a driving shaft including a plurality of teeth and disposed in a vertical direction in the control rod drive mechanism, a first part configured to hold or release a lower end portion of the driving shaft depending on whether a stationary gripper coil is activated, a second part configured to hold or release an intermediate portion of the driving shaft depending on whether a movable gripper coil is activated, and a third part configured to move the second part in the vertical direction depending on whether a lift coil is activated, the method comprising:
    activating at least one of the stationary gripper coil, the movable gripper coil, and the lift coil to drive the first part, the second part, or the third part in a state in which the driving shaft is not able to move; and
    removing the foreign substances from the first part, the second part, or the third part by driving any of the first part, the second part, or the third part,
    wherein the removing of the foreign substances from the first part is performed by activating the lift coil to move the second part upward in the vertical direction while the stationary gripper coil is activated to hold the lower end portion of the driving shaft with the first part.

2. The method of claim 1 further comprising:
    inactivating the lift coil to move the second part downward in the vertical direction.

3. The method of claim 2, further comprising:
    repeating the activating and the inactivating the lift coil.

4. The method of claim 1, wherein the first part comprises:
    a first latch configured to be latched on any of a plurality of teeth of the driving shaft;
    a first link having one end connected to the first latch and the other end connected to a first latch plunger;
    a first latch pole with or without magnetism according to whether the stationary gripper coil is activated; and
    the first latch plunger pulled or not pulled to the first latch pole according to whether the stationary gripper coil is activated.

5. The method of claim 4, wherein the second part comprises:
    a second latch configured to be latched on any of a plurality of teeth of the driving shaft;
    a second link having one end connected to the second latch and the other end connected to a second latch plunger;
    a second latch pole with or without magnetism according to whether the movable gripper coil is activated; and
    the second latch plunger pulled or not pulled to the second latch pole according to whether the movable gripper coil is activated.

6. The method of claim 5, wherein the third part comprises:
    a third pole with or without magnetism according to whether the lift coil is activated,
    wherein the second latch pole is pulled or not pulled to the third pole according to whether the lift coil is activated.

7. The method of claim 1, further comprising setting an operation prohibition condition with respect to the lift coil, the operation prohibition condition being a state in which the stationary gripper coil and the movable gripper coil are activated.

* * * * *